W. W. DAVIS AND W. W. MacDONALD.
GREASE CUP.
APPLICATION FILED AUG. 13, 1919.
1,381,809.
Patented June 14, 1921.
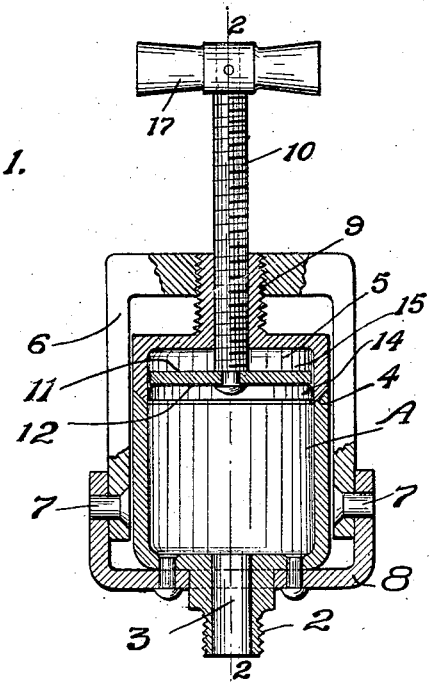
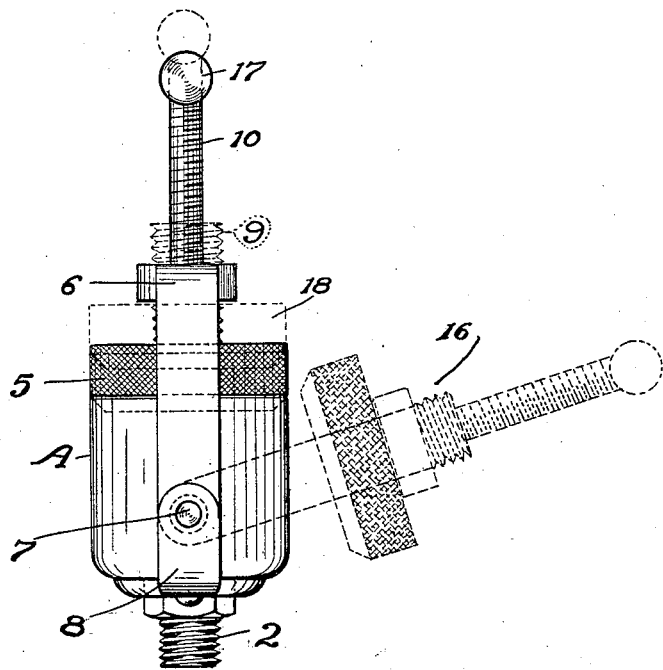
INVENTOR
William W. Davis.
William W. MacDonald
BY Strong & Townsend.
ATTORNEYS

UNITED STATES PATENT OFFICE.

WILLIAM W. DAVIS AND WILLIAM W. MacDONALD, OF SAN FRANCISCO, CALIFORNIA.

GREASE-CUP.

1,381,809.

Specification of Letters Patent.

Patented June 14, 1921.

Application filed August 13, 1919. Serial No. 317,187.

*To all whom it may concern:*

Be it known that we, WILLIAM W. DAVIS and WILLIAM W. MACDONALD, citizens of the United States, residing at the city and county of San Francisco and State of California, have invented new and useful Improvements in Grease - Cups, of which the following is a specification.

This invention relates to a grease cup, and particularly to improvements on the structure shown in a patent issued to us April 3rd, 1917, No. 1,221,031, entitled "Grease cup."

One of the objects of the present invention is to provided a simple, cheaply manufactured compression grease cup which is particularly adapted for use on automobiles and other machines where accessibility and quick manipulation are important factors. Another object of the invention is to provide a bail for the support of the cover and in conjunction therewith a plunger for the ejection of the grease. Another object of the invention is to provide a cover which is vertically adjustable with relation to the bail and in which is formed a recess for the reception of the plunger; and, furthermore, to provide means for raising and lowering the plunger with relation to the grease cup and the cover independently of the cover. Another object of the invention is to provide a plunger packing of novel construction. Further objects will hereinafter appear.

Having reference to the accompanying drawings:

Figure 1 is a central, vertical section through the grease cup.

Fig. 2 is a side elevation of the same.

Referring to the drawings in detail, A indicates a grease cup, on the lower end of which is formed a threaded extension 2. Formed in the threaded extension is a discharge opening 3, and formed at the upper end of the cup is an annular inclined seat 4 for the reception of a cover 5. The cover is in this instance carried by a bail member 6, which is pivotally attached to the grease cup, as at 7, by means of a bracket 8, or other suitable support formed on or secured to the cup.

Formed on the cover 5 is a threaded extension 9, and formed on the bail is a central threaded opening for the reception of the threaded extension 9, thereby permitting vertical adjustment of the cover with relation to the bail. Formed in the threaded extension 9 is a central threaded opening which is provided for the reception of a screw rod 10, and secured on the lower end of the screw rod is a plunger which consists of a plate 11 and a packing disk 12. The packing disk is in this instance constructed of thin sheet metal, such as brass or the like, and is provided with an annular downwardly extending flange 14, which is resilient, due to the nature and thinness of the metal.

A simple and efficient form of packing is in this manner provided which is self-adjusting as it will automatically take up such wear as may take place, due to the fact that the annular flange is resilient and slightly larger in diameter than the interior of the cup. It is, therefore, forced into place when first inserted and will gradually expand as wear takes place.

By referring to Fig. 1 it will be seen that the lower edge of the cover is tapered to form a tight joint with the seat 4, formed at the upper end of the grease cup and that a chamber 15 is formed interiorly of the cover for the reception of the plunger. This is important as it permits the plunger, together with the cover, to be raised vertically with relation to the bail and permits swinging of the bail, the cover and the plunger into the dotted line position shown at 16, when the cup is to be recharged or filled with grease.

In actual operation, we provide a suitable form of handle, such as shown at 17. By means of this handle it is possible to turn the screw rod 10 to raise and lower the plunger. For instance, if it is desired to fill the cup it is accomplished by raising the plunger to the position shown in Fig. 1 and then to turn the cover until the raised dotted line position is assumed, as shown at 18 (see Fig. 2). The bail containing the cover and the plunger may then be swung into the dotted line position, shown at 16, thereby leaving the open end of the cup free and unobstructed for refilling.

When closing the cup it is only necessary to swing the bail back into alinement and to turn the cover 5 in the opposite direction a sufficient distance to cause it to tightly engage the seat 4. The plunger is then lowered against the grease to force it out through the discharge opening by merely turning the handle 17. Practically any pressure may thus be applied to the grease as a comparatively low pitched thread may be employed if desired.

From the foregoing description it can be seen that we have provided a cover for the grease cup which may be raised and lowered vertically with relation thereto or swung to one side, as shown in Fig. 2; also that a plunger is provided which may be raised and lowered in unison with the cover or independently thereof or raised up into the cover where it may be swung to one side in unison with the bail and cover, thereby leaving the mouth of the grease cup free and unobstructed. Again, a novel form of metallic packing is provided, which practically insures against leakage; this being due to the fact that the resiliency of the downturned annular flange automatically takes up wear, thereby maintaining a tight and what may be termed a ground joint. The escape of grease between the cover and the cup cannot take place as any grease which might pass by the plunger and the packing disk carried thereby would only enter the space 15 formed in the cover and as it would not be under pressure when in the cover chamber, it can readily be seen that there would be no tendency for leakage through the seat formed between the cover and the cup. Even leakage by gravity is avoided as the angular seat formed is downturned, thereby preventing such leakage.

While a more or less specific structure is here shown, for instance, such as is usual for the mounting of the bail, we wish it understood that various changes in the design, form and proportions may be resorted to within the scope of the appended claims, and also that the materials and finish of the several parts employed may be such as the experience and judgment of the manufacturer may dictate or varying conditions may demand.

Having thus described our invention, what we claim and desire to secure by Letters Patent is—

1. A grease cup comprising an open-ended cup having a discharge opening formed at the opposite end thereof, a bail pivotally attached to the cup, a cover carried by the bail and vertically adjustable therein, and a plunger carried by the cover and vertically movable with relation to the cover and cup and adapted to be received in the cover.

2. A grease cup comprising an open-ended cup having a discharge opening formed at the opposite end thereof, a bail pivotally attached to the cup, a cover carried by the bail and vertically adjustable therein, and a plunger carried by the cover and vertically adjustable with relation to the cover and cup.

3. A grease cup comprising an open-ended cup having a discharge opening formed at the opposite end thereof, a bail pivotally attached to the cup, a cover carried by the bail and vertically adjustable therein, and a plunger carried by the cover and vertically adjustable with relation to the cover and cup and independent of the cover.

4. A grease cup comprising an open-ended cup, a cover for the cup, a plunger for the cup, and means permitting vertical and pivotal movement of the cover and plunger with relation to the cup, said means permitting vertical movement of the cover and plunger independently of each other.

5. A grease cup comprising a cup, a bail pivotally mounted on the cup, a cover for the cup, a threaded extension on the cover extending through the bail to support the cover and to permit vertical adjustment of the cover with relation to the bail and the cup, a screw rod extending through the threaded extension on the cover, means for turning the screw rod, and a plunger on the lower end of the screw rod within the cup.

6. A grease cup comprising a cup, a bail pivotally mounted on the cup, a cover for the cup, a threaded extension on the cover extending through the bail to support the cover and to permit vertical adjustment of the cover with relation to the bail and the cup, a screw rod extending through the threaded extension on the cover, means for turning the screw rod, a plunger on the lower end of the screw rod within the cup, and a chamber formed in the cover into which the plunger is adapted to be raised.

7. A grease cup comprising a cup, a bail pivotally mounted on the cup, a cover for the cup, a threaded extension on the cover extending through the bail to support the cover and to permit vertical adjustment of the cover with relation to the bail and the cup, a screw rod extending through the threaded extension on the cover, means for turning the screw rod, a plunger on the lower end of the screw rod within the cup, a chamber formed in the cover into which the plunger is adapted to be raised, and a downwardly inclined seat formed on the cup for the reception of the cover.

8. The combination with a plunger, of a packing therefor, said packing comprising a thin metallic disk slightly larger in diameter than the plunger, and a resilient continuous annular flange formed on the disk.

9. The combination with a plunger, of a packing therefor, said packing comprising a thin metal disk constructed of spring metal, and a resilient spring-like annular flange formed on the disk and having a diameter slightly larger than the plunger.

10. A grease cup comprising an open-ended cup having a discharge opening formed at the opposite end thereof, a bail pivotally attached to the cup, a cover carried by the bail, and vertically adjustable therein, a screw rod carried by the cover and vertically adjustable with relation to the cover and cup, a disk secured on the lower end of the screw rod, and a thin metallic disk secured to the first named disk, said thin metallic disk being constructed of spring metal and provided with an annular downwardly turned rim, said rim having a diameter slightly larger than that of the first named disk.

11. The combination with a plunger, of a packing member therefor, said packing member comprising a thin metallic disk constructed of spring metal, said disk having a diameter slightly larger than the plunger, said disk being rigidly secured to the plunger and having its major surface contacting with and supported by the plunger, and a resilient continuous annular flange formed on the outer periphery of the disk.

12. A packing member of the character described comprising a thin metallic spring metal disk and a resilient continuous annular flange formed on the disk, having an exterior diameter slightly larger than the cylinder in which it is intended to travel, said annular continuous flange adapted to be slightly contracted when inserted in the cylinder and adapted to automatically expand as wear takes place, a plunger, said plunger being slightly smaller in diameter than the metallic disk, and means securing the disk with relation to the plunger.

In testimony whereof we have hereunto set our hands in the presence of two subscribing witnesses.

WILLIAM W. DAVIS.
WILLIAM W. MacDONALD.

Witnesses:
THOMAS CASTBERG,
W. W. HEALEY.